R. S. Child.
Lamp Black.
No. 32,753  Patented July 9, 1861.
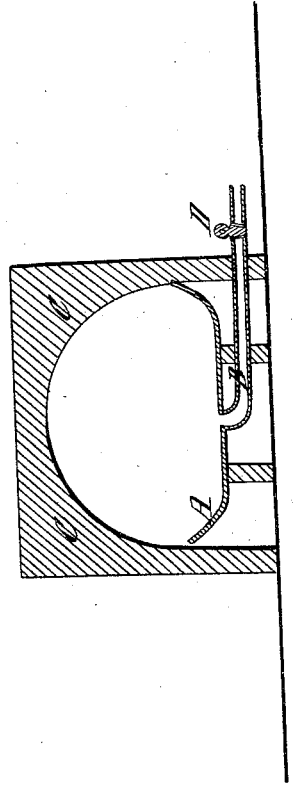
Witnesses.
Hartley Knight.
Benjamin P. Adams
Inventor
R. S. Child

UNITED STATES PATENT OFFICE.

RICHARD S. CHILD, OF PHILADELPHIA, PENNSYLVANIA.

UTILIZATION OF COAL-TAR.

Specification of Letters Patent No. 32,753, dated July 9, 1861.

*To all whom it may concern:*

Be it known that I, RICHARD S. CHILD, of Philadelphia, State of Pennsylvania, have discovered a new and useful Process of Utilizing Coal-Tar; and I do hereby declare the following to be a full, clear, and exact description of the same, reference being had to the annexed drawing, making a part of this specification, and which represents a cross-section of lampblack-furnace provided with apparatus most convenient for my purpose.

The nature of my invention consists in a process wherein all the products of coal tar are rendered directly valuable.

Hitherto coal tar has been converted into lamp black, and a substance resembling coke. This residue or coke is comparatively worthless. Coal tar has also been converted into roofing cement by boiling, or into roofing cement and certain volatile ingredients by distillation. These volatile ingredients however to be rendered of value must undergo refinement. Now I have discovered that by the process herein described coal tar may be converted, at a single operation into lamp black and roofing cement, with a saving of over fifty per cent. in time and labor.

The amount of cement produced by this process from a given amount of tar is as great as the amount produced by any known process, while at the same time an amount of lamp black is produced but slightly less than would be produced from the same amount of tar in the known mode of manufacturing lamp black. Thus from practical experiments I find that eighty gallons of tar in the lamp black process will produce about one hundred and forty pounds of lamp black and about   bushels of coke or residue. By the roofing cement process, it will produce about three hundred pounds of cement. By my improved process, from this amount of tar I obtain about one hundred and twenty-six pounds of lamp black and about three hundred pounds of roofing cement. These amounts will of course slightly vary according to the quality of the coal tar used.

Hitherto it has required from three to six hours to convert the tar either into lamp black or roofing cement. By my process it can be converted into these two substances in about one hour.

In the drawing A represents a shallow pan, placed in a furnace C connected with the receiving chamber of an ordinary lamp black factory, B is a pipe, running from the bottom of this pan, to the outside of the furnace and provided with a suitable stop cock D.

The tar is placed in the shallow pan A and set on fire—the smoke or lamp black passing off being collected in the usual manner. After burning an hour, (or a time sufficient to reduce the cement to the desired hardness) I draw the tar off by means of the pipe B into barrels or cisterns and leave them to cool. When cold the tar resembles the roofing cement made by distilling or boiling the tar, and which is used in the manufacture of felt or composition roofs.

The advantages of thus converting coal tar into roofing cement and lamp black instead of into lamp black and a worthless residue, or into roofing cement and volatile matters, are obvious. The products of the tar are rendered at a single operation directly more valuable, and a great saving in time and labor is effected.

I find that burning the tar about one hour, will produce almost all the lamp black which it is capable of producing and also reduce the tar to the consistency necessary for a good roofing cement. By burning it however, a longer or shorter time, roofing cement of any desired hardness may be produced.

Should the pipe B become filled with the hard cement, which it is liable to if it extends much beyond the furnace, the inconvenience may be remedied by surrounding the pipe with hot water, or by passing it over a small furnace.

Instead of removing the cement from the kettle by the pipe B, any convenient mode, such as by a pump, may be employed.

Having thus described my process what I claim and desire to secure by Letters Patent is—

The process herein described of utilizing coal tar by converting it into roofing cement and lamp black instead of into lamp black and a worthless residue or into roofing cement and volatile substances.

R. S. CHILD.

Witnesses:
HARTLEY KNIGHT,
BENJAMIN P. ADAMS.